United States Patent
Lee et al.

(10) Patent No.: US 8,818,200 B2
(45) Date of Patent: *Aug. 26, 2014

(54) MULTIPLE STAR WAVELENGTH DIVISION MULTIPLEXING PASSIVE OPTICAL NETWORKS USING A WAVELENGTH ASSIGNMENT METHOD

(75) Inventors: Chang-Hee Lee, Daejeon (KR); Sang-Mook Lee, Daejeon (KR); Sil-Gu Mun, Daegu (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 1142 days.

This patent is subject to a terminal disclaimer.

(21) Appl. No.: 12/087,034

(22) PCT Filed: Dec. 5, 2006

(86) PCT No.: PCT/KR2006/005204
§ 371 (c)(1),
(2), (4) Date: Apr. 14, 2009

(87) PCT Pub. No.: WO2007/074979
PCT Pub. Date: Jul. 5, 2007

(65) Prior Publication Data
US 2010/0046945 A1    Feb. 25, 2010

(30) Foreign Application Priority Data
Dec. 28, 2005 (KR) .................. 10-2005-0131999

(51) Int. Cl.
*H04J 14/02* (2006.01)
*H04B 10/00* (2013.01)

(52) U.S. Cl.
USPC .............. 398/167.5; 398/79; 398/89; 398/91; 398/140; 398/153; 398/165; 398/168

(58) Field of Classification Search
CPC ....... H04J 14/00; H04J 14/02; H04J 14/0227; H04J 14/0228; H04J 14/023; H04J 14/0231; H04J 14/0232; H04J 14/0234; H04J 14/0235; H04J 14/0236; H04J 14/0238; H04J 14/0239; H04J 14/0241; H04J 14/0242; H04J 14/0243; H04J 14/0246; H04J 14/0247; H04J 14/0249; H04J 14/025; H04J 14/0252
See application file for complete search history.

(56) References Cited

U.S. PATENT DOCUMENTS
5,570,217 A * 10/1996 Fleuren .......................... 398/13
(Continued)

FOREIGN PATENT DOCUMENTS
EP          0847159 A2     6/1998
KR       2004-0103085    12/2004
WO   WO 2005/099148 A1 * 10/2005  .............. H04J 14/02

OTHER PUBLICATIONS
Amitabha Banerjee, et al., "Wavelength-division-multiplexed passive optical network (WDM-PON) technologies for broadband access: a review", Nov. 2005, Journal of Optical Networks, vol. 4, No. 11, pp. 737-758.*

(Continued)

*Primary Examiner* — Darren E Wolf
(74) *Attorney, Agent, or Firm* — Billion & Armitage (57) ABSTRACT

The present invention discloses a multiple star wavelength division multiplexing passive optical network system using a wavelength assignment method. In a multiple star wavelength division multiplexing passive optical network system using a wavelength assignment method according to the present invention, only one WDM-PON system can provide services for a plurality of subscribers who is distributed in a wide range of area through multiple starring, by setting one or more band for transmitting up-stream signals as an up-stream basic band and one or more band for transmitting down-stream signals as a down stream basic band, respectively, and by dividing each of the up-stream basic band and the down stream basic band into a plurality of wavelength sub-bands and assigning the divided sub-bands to different areas using a wavelength division multiplexer/de-multiplexer which splits a band into two or more sub-bands.

8 Claims, 7 Drawing Sheets

(56) References Cited

U.S. PATENT DOCUMENTS

| | | |
|---|---|---|
| 5,808,764 A | 9/1998 | Frigo et al. |
| 6,577,422 B1 | 6/2003 | Frigo et al. |
| 2002/0006250 A1 | 1/2002 | Wedding |
| 2002/0150329 A1 | 10/2002 | Ahn et al. |
| 2003/0174949 A1 | 9/2003 | Bhardwaj et al. |
| 2005/0025484 A1* | 2/2005 | Jung et al. ............... 398/68 |
| 2006/0115270 A1 | 6/2006 | Kim et al. |
| 2007/0274729 A1 | 11/2007 | Lee et al. |

OTHER PUBLICATIONS

International Application No. PCT/KR2006/005204, International Search Report mailed Mar. 16, 2007, 3 pgs.

International Application No. PCT/KR2006/005204, Written Opinion mailed Mar. 16, 2007, 4 pgs.

Gibilisco et al., Encyclopedia of Electronics, $2^{nd}$ Edition (1990) McGraw-Hill Inc., p. 429.

* cited by examiner

MULTIPLE STAR WAVELENGTH DIVISION MULTIPLEXING PASSIVE OPTICAL NETWORKS USING A WAVELENGTH ASSIGNMENT METHOD

RELATED APPLICATION

This application is a nationalization under 35 U.S.C. 371 of PCT/KR2006/005204, filed Dec. 5, 2006 and published as WO 2007/074979 A1 on Jul. 5, 2007; which claimed priority under 35 U.S.C. 119 to Korean Patent Application Serial No. 10-2005-0131999, filed Dec. 28, 2005, which applications and publication are incorporated herein by reference and made a part hereof.

TECHNICAL FIELD

The present invention relates to a multiple star wavelength division multiplexing passive optical network (WDM-PON) using a wavelength assignment method. More specifically, the present invention relates to a multiple star WDM-PON using a wavelength assignment method where only one WDM-PON system can provide services for a plurality of subscribers who is distributed in a wide range of area through multiple starring, by setting one or more band for transmitting up-stream signals as an up-stream basic band and one or more band for transmitting down-stream signals as a down-stream basic band, respectively, and by dividing each of the up-stream basic band and the down-stream basic band into a plurality of wavelength sub-bands and assigning the divided sub-bands to different areas using a wavelength division multiplexer/de-multiplexer which splits a band into two or more sub-bands.

BACKGROUND ART

Demand on a higher speed of networks is sharply increased as voice and text oriented services have evolved to video based services due to a rapid expansion of Internet. In addition, achieving a higher capacity network is necessarily required to provide services, which integrate video, data and audio, through one network infrastructure. To meet this demand and requirement, a study on passive optical network (PON) technologies based on optical fiber has actively carried out.

Typical types of the PON technologies are classified as a time division multiplexing passive optical network (TDM-PON) and a WDM-PON. From the two typical types of the PON technologies, a WDM-PON is considered to be an ultimate alternative of a high capacity access network, because it has advantages including a wide bandwidth, a high level of security, easiness of extension, and a high degree of transparency regarding a transmission speed and protocols, etc.

A WDM-PON is a passive optical network which shares an optical fiber by using a method of a wavelength division multiple access (WDMA) and comprises an optical line termination (OLT) being installed at a central office (CO); a remote node (RN) being preferably embodied by an arrayed wavelength grating (AWG); and an optical network termination (ONT) being installed at a subscriber.

Figure 1:
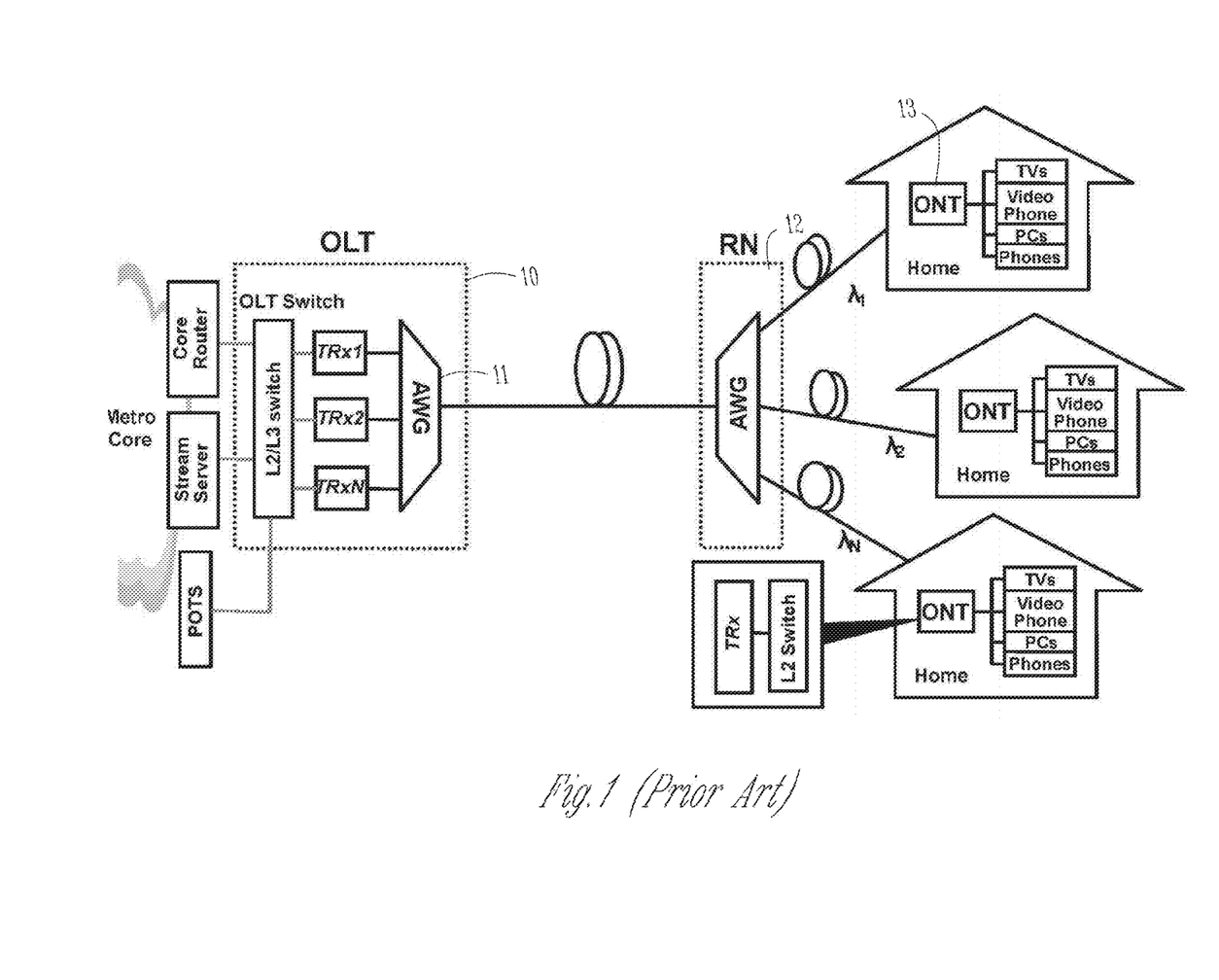
FIG. 1 illustrates a structural view of WDM-PON in accordance with prior art.

FIG. 1 illustrates a structural view of WDM-PON in accordance with prior art. Referring to FIG. 1, RN is installed in a manhole or on an electric pole and is mainly comprised of AWG. However, RN may be embodied by using a wavelength division multiplexer/de-multiplexer (hereinafter referred to as WDM), like a thin film filter. RN is connected to a plurality of ONTs, which is equipment for subscribers, by using separate optical fibers.

In a WDM-PON, a guaranteed bandwidth being provided for each subscriber is very broad so that it is possible to integrate services provided by a TV such as an internet protocol television (IP TV), a telephone, a visual telephone, an internet, etc., as can be seen from FIG. 1. FIG. 1 shows an example of a WDM-PON which employs an internet protocol. OLT of a WDM-PON as shown in FIG. 1 requires an L2/L3 switch for separating traffics, depending on services, in order to connect OLT to upper-level equipments (which are specifically equipments being connected to the L2/L3 switch as shown in FIG. 1, such as plain old telephone service (POTS), a stream server, and a core router) depending on respective services.

Each of a plurality of ONTs requires an optical transceiver for communication between OLT and each ONT, while OLT also requires an optical transceiver corresponding to an optical transceiver at anyone of each ONT. AWG, which is a passive device and being installed in RN, performs both a function of de-multiplexing a down-stream signal which is transmitted from OLT and transmitting the de-multiplexed down-stream signal to each ONT and a function of wavelength division multiplexing an up-stream signal which is transmitted from each ONT and transmitting the multiplexed up-stream signal to OLT. Similarly, AWG in OLT also performs both a function of multiplexing a down-stream signal which is transmitted to each ONT and a function of wavelength division de-multiplexing an up-stream signal which is transmitted from each ONT to OLT. Accordingly, the AWG in OLT and the AWG in RN must have the same characteristic. That is, a transmission wavelength in each terminal of the AWG in OLT must be the same as a transmission wavelength in each corresponding terminal of the AWG in RN.

Generally, a TDM-PON may accommodate subscribers distributed in various areas simply by connecting plural optical power splitters and multiple stalling them, if an enough value of power margin in the TDM-PON system is guaranteed. However, in case of a WDM-PON, multiple starring is impossible by using plural optical power splitters only because a specific value of wavelength is assigned to each ONT and a wavelength division multiplexer/de-multiplexer (WDM) must be employed. Thus, an existing WDM-PON is useful where many subscribers, who need a wide bandwidth, are densely distributed in one area, while it is difficult for one WDM-PON to accommodate subscribers who are distributed in a wide area or various areas. Further, even though the number of subscribers to be accommodated by one PON is small, equipments for all subscribers who are available to be accommodated must be installed initially and thus there is a problem that high initial investment costs are required. One method to solve this problem is disclosed in a Korean patent laid-open publication No. 10-2005-0099229, which was filed on Apr. 9, 2004 and was laid-open on Oct. 13, 2005, with the title of "WAVELENGTH DIVISION MULTIPLEXING PASSIVE OPTICAL NETWORK HAVING MULTIPLE BRANCH DISTRIBUTION NETWORK" and a Korean patent laid-open publication No. 10-2005-0092684, which was filed on Aug. 31, 2005 and was laid-open on Sep. 22, 2005, with the title of "MULTIPLE BRANCH WDM-PON SYSTEM USING CYCLIC AWG." However, in the above referenced laid-open publications, a structure of a filter for combining and splitting up-stream signals and down-stream signals becomes complicated as the number of branches increases. In addition, an insertion loss is also increased due to the use of one or more coupler. Further, it is difficult in terms of maintenance and management because two AWGs (AWG1 and AWG2) having different types of a transmission wavelength characteristic from each other are required to be used in second RNs.

DISCLOSURE OF INVENTION

Technical Problem

The object of the present invention is to solve the prior art problems, more specifically, to solve the prior art problems in terms of a difficulty of multiple starring due to employing a WDM which is main equipment in a WDM-PON and high costs to be invested initially, by setting one or more band for transmitting up-stream signals as an up-stream basic band and setting one or more band for transmitting down-stream signals as a down-stream basic band (typically, setting one up-stream band and one down-stream band as two basic bands), and by dividing each of the up-stream basic band and the down-stream basic band into a plurality of wavelength sub-bands and assigning the divided sub-bands to different areas, through using a band splitting wavelength division multiplexer/de-multiplexer (BSWDM), so that only one WDM-PON system can provide services for a plurality of subscribers who is distributed in a wide range of area through multiple starting.

Technical Solution

According to a first aspect of the present invention, the present invention provides a multiple star wavelength division multiplexing passive optical network (WDM-PON) system using a wavelength assignment method comprising an optical line termination (OLT) comprised of a first wavelength division multiplexer/de-multiplexer (WDM) and a plurality of first optical transceivers being connected to the first WDM; a first remote node (RN) comprised of a band splitting wavelength division multiplexer/de-multiplexer (BSWDM) being connected to the OLT by an optical fiber, wherein the BSWDM splits a wavelength band for certain down-stream signals into a plurality of first wavelength sub-bands and combines a plurality of second wavelength sub-bands, into which a wavelength band for certain up-stream signals is split, with the wavelength band for the certain up-stream signals; a plurality of second RNs being connected to the first RN by a plurality of optical fibers, wherein each of the second RNs is comprised of a second WDM; and a plurality of optical network terminations (ONTs) being connected to the plurality of the second RNs by a plurality of separate optical fibers, wherein each of the plurality of ONTs is comprised of a second optical transceiver, wherein a guard band, indicated as $\lambda_{gb}$ and positioned between an up-stream basic band being used for the wavelength band for the certain up-stream signals and a down-stream basic band being used for the wavelength band for the certain down-stream signals is given by a formula of $\lambda_{gb}=\lambda_{gi}+m[\lambda_{gi}+(n-1)\times\lambda_c]$, wherein n indicates a number of channels which exist within either the first wavelength sub-bands or the second wavelength sub-bands; wherein $\lambda_{gi}$ indicates a guard band positioned either between the first wavelength sub-bands split from the down-stream basic band or between the second wavelength sub-bands split from the up-stream basic band; wherein $\lambda_c$ indicates a wavelength interval between the channels; and wherein m is a natural number including number 0.

According to a second aspect of the present invention, the present invention provides a multiple star wavelength division multiplexing passive optical network (WDM-PON) system using a wavelength assignment method comprising an optical line termination (OLT) comprised of a first band splitting wavelength division multiplexer/de-multiplexer (BSWDM) which splits a wavelength band for certain up-stream signals into a plurality of first wavelength sub-bands and combines a plurality of second wavelength sub-bands, into which a wavelength band for certain down-stream signals is split, with the wavelength band for the certain down-stream signals; a plurality of first wavelength division multiplexers/de-multiplexers (WDMs) being connected to the first BSWDM, respectively; and a plurality of 1st-group optical transceivers to a plurality of p-group optical transceivers, wherein the plurality of each-group optical transceivers is connected to each of the first WDMs, respectively; a first remote node (RN) comprised of a second BSWDM being connected to the OLT by a first optical fiber, wherein the second BSWDM splits the wavelength band for the certain down-stream signals into the plurality of the second wavelength sub-bands and combines the plurality of the first wavelength sub-bands with the wavelength band for the certain tip-stream signals; a plurality of second remote nodes (RNs) being connected to the first RN by a plurality of second optical fibers, wherein each of the second RNs is comprised of a second wavelength division multiplexer/de-multiplexer (WDM); and a plurality of optical network terminations (ONTs) being connected to the plurality of the second RNs by a plurality of third optical fibers, wherein each of the plurality of ONTs is comprised of a second optical transceiver, wherein p corresponds to a number of the plurality of the first WDMs; wherein a guard band, indicated as $\lambda_{gb}$ and positioned between an up-stream basic band being used for the wavelength band for the certain up-stream signals and a down-stream basic band being used for the wavelength band for the certain down-stream signals is given by a formula of $\lambda_{gb}=\lambda_{gi}+m[\lambda+(n-1)\times\lambda_c]$; wherein n indicates a number of channels which exist within either the first wavelength sub-bands or the second wavelength sub-bands; wherein $\lambda_{gi}$ indicates a guard band positioned either between the first wavelength sub-bands split from the up-stream basic band or between the second wavelength sub-bands split from the down-stream basic band; wherein $\lambda_c$ indicates a wavelength interval between the channels; wherein m is a natural number including number 0; and wherein the plurality of the first wavelength sub-bands and the plurality of the second wavelength sub-bands are capable of being additionally installed.

Further features and advantages of the present invention can be obviously understood with reference to the accompanying drawings where same or similar reference numerals indicate same components.

Advantageous Effects

According to a WDM-PON having a multiple star function by using a BSWDM in accordance with the present invention accomplishes the following advantages:

First, it is possible to use a WDM-PON effectively and expand service areas by making several bands, which are multiple starred by a BSWDM, available to subscribers distributed in different areas from each other.

Second, it is easy to maintain and manage a WDM-PON system because all equipments for subscribers may employ the same type of an optical transceiver having a filter for splitting basic bands (D-band and U-band, and other bands being used), while the WDM-PON system makes it possible for subscribers distributed in different areas to use sub-bands split by multiple starling.

Third, it is easy to maintain and manage a WDM-PON system because the same type of AWGs can be employed in all RNs which are multiple started, by using a plurality of AWGs where each FSR for the plurality of AWGs being used in a plurality of RNs is the same as a wavelength range of the split sub-bands, as given by the formula of $FSR=\lambda_{gi}+(n-1)\lambda_c$.

Fourth, it is possible to reduce initial investment costs by installing additionally OLTs and RNs subsequently depending on the increase in the number of subscribers, in case that a WDM-PON system is not installed for each subscriber.

BEST MODE FOR CARRYING OUT THE INVENTION

Hereinafter, a WDM-PON system embodied by the present invention and a wavelength assignment method therein will be described in more detail with reference to the appended drawings.

Figure 2:
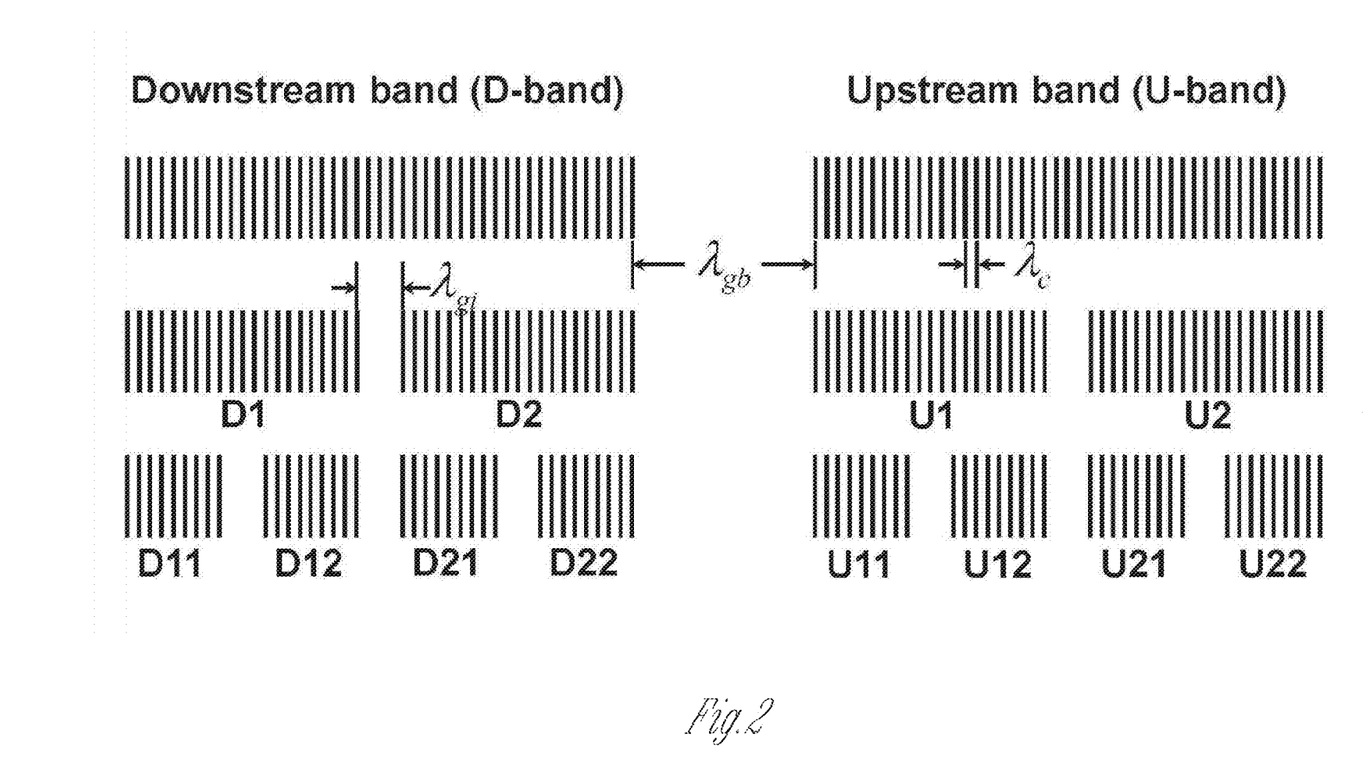
FIG. 2 illustrates a wavelength assignment method in a band for up-stream signals and a band for down-stream signals for multiple starring in WDM-PON in accordance with the present invention.

FIG. 2 illustrates a wavelength assignment method in a band for up-stream signals and a band for down-stream signals for multiple stalling in WDM-PON in accordance with the present invention. Referring to FIG. 2, a wavelength band for down-stream signals uses D-band as a down-stream basic band and a wavelength band for up-stream signals uses U-band as an up-stream basic band. Each of equipments for subscribers in ONTs has a filter for splitting D-band and U-band. With this, all subscribers may use the same type of an optical transceiver.

$\lambda_{gb}$ indicates a guard band positioned between a band for up-stream signals and a band for down-stream signals (i.e., between an up-stream basic band and a down-stream basic band) and is adaptable to embody a cost-effective optical transceiver, while $\lambda_c$ indicates a wavelength interval between channels. A free spectral range (FSR) of AWG indicates a wavelength interval where a transmission characteristic appears periodically in one terminal. D-band and U-band may be assigned with a separation gap by integer times of FSR of AWG.

In order for two starring a WDM-PON, a BSWDM is required to split D-band into two sub-bands of D1-band and D2-band and to split U-band into two sub-bands of U1-band and U2-band. Here, $\lambda_{gi}$ indicates a guard band positioned either between D1-band and D2-band being split within D-band or between U1-band and U2-band being split within U-band. $\lambda_{gb}$, which is a guard band positioned between U-band and Down-band, is generally given by the formula (1) as follows:

$$\lambda_{gb}=\lambda_{gi}+m[\lambda_{gi}+(n-1)\times\lambda_c] \quad (1)$$

From the above formula (1), n indicates a number of channels which exist within the split sub-bands, while m=0, 1, 2, (i.e., a natural number including number 0). Signals of the sub-bands split from either U-band or D-band are multiplexed/de-multiplexed in second RNs different from each other through separate optical fibers. An FSR of AWG being used in a second RN makes a wavelength range same as that of the split sub-bands, as can be seen from formula (2) given below, and thus all second RNs employ AWGs having the same characteristic. In this case, each ONT employs only a filter for splitting D-band and U-band, each of which is a basic band, independently of the split sub-bands, and thus it is possible for all ONTs to employ the same type of an optical transceiver. As a result, a WDM-PON system is not required to equip various kinds of components, which leads to a reduction of costs for initial installing and maintaining a WDM-PON system.

$$FSR=\lambda_{gi}+(n-1)\lambda_c \quad (2)$$

Referring back to FIG. 2, in order for four starring a WDM-PON, D-band is required to be split into four sub-bands of D11-band, D12-band, D-21-band and D22-band and U-band is required to be split into four sub-bands of U11-band, U12-band, U21-band and U22-band by using plural BSWDMs. If this type of a starring method is applied widely, a more number of starring in a WDM-PON can be performed. Here, a BSWDM, which splits each of a band for up-stream signals and a band for down-stream signals into plural sub-bands, may be embodied by using one filter device (e.g., AWG) having a periodic transmission wavelength characteristic, instead of using plural filters. In addition, an FSR of AWG being used in a second RN makes a wavelength range same as that of the split sub-bands, as can be seen from formula (3) given below, and thus all second RNs employ AWGs having the same characteristic.

$$FSR=\lambda_{gi}+(n-1)\lambda_c \quad (3)$$

Generally, O-band (1260 nm~1360 nm), E-band (1360 nm~1460 nm), S-band (1460 nm~1530 nm), C-band (1530 nm~1565 nm), L-band (1565 nm~1625 nm), and Ultra-long-band (1625 nm~1675 nm) may be used as a permissible transmission band in an optical telecommunications. Among those permissible transmission bands, it is possible to extend a wavelength assignment band by using another permissible transmission band different from a transmission band which is assigned as D-band and U-band as basic bands. Even in this case, each band and its adjacent band have a guard band given by formula (1) above therebetween. An extended wavelength assignment band provides a wider bandwidth by assigning one or more band as a wavelength band for up-stream signals and a wavelength band for down-stream signals so that a WDM-PON may accommodate various services. Further, an extended wavelength assignment band can be used as a band for monitoring a WDM-PON system, while all ONTs employ the same type of an optical transceiver having a filter for splitting D-band, U-band and other bands which are being used.

Figure 3:
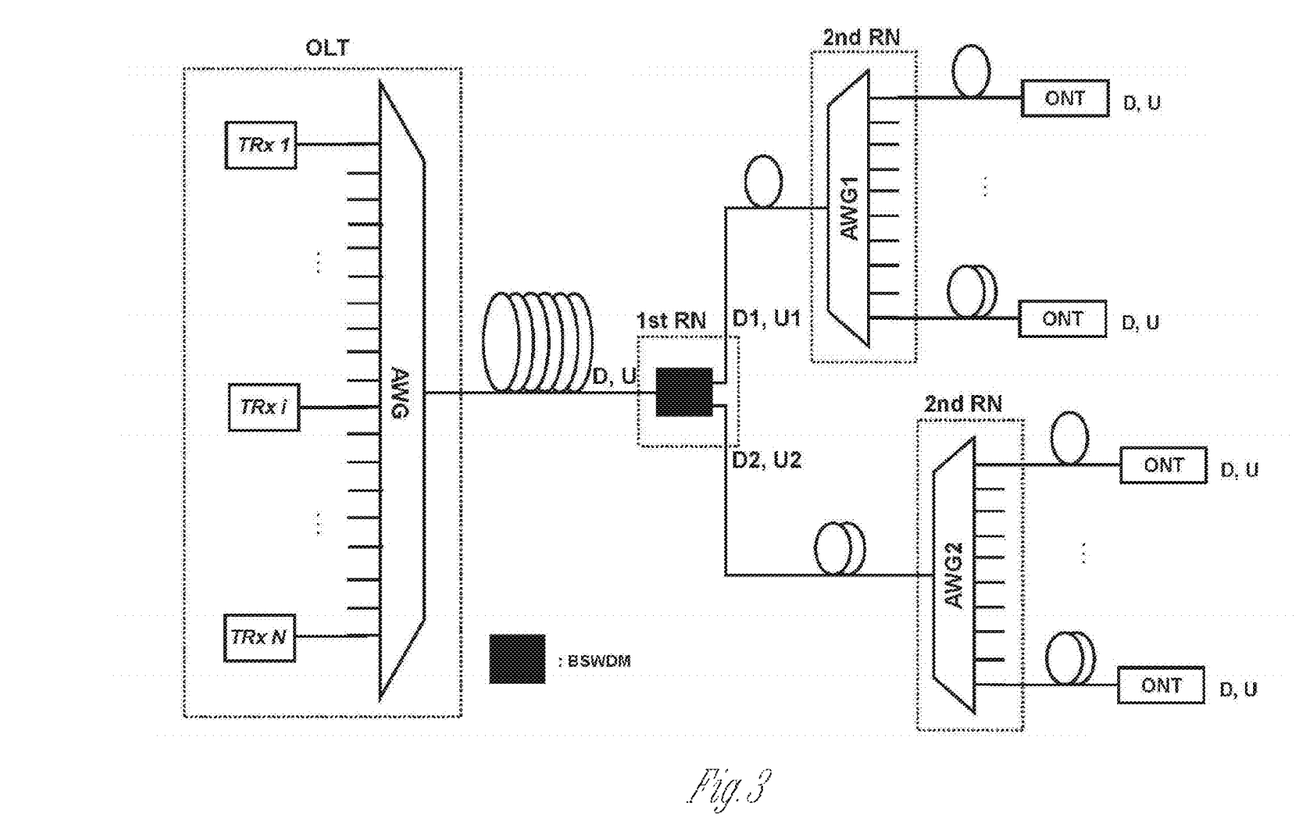
FIG. 3 illustrates a structural view of two-starred WDM-PON which uses a wavelength assignment method and a band splitting wavelength division multiplexer/de-multiplexer (BSWDM) in accordance with the present invention.

FIG. 3 illustrates a structural view of two-starred WDM-PON which uses a wavelength assignment method and a band splitting wavelength division multiplexed/de-multiplexer (BSWDM) in accordance with the present invention. Referring to FIG. 3, a two-starred WDM-PON comprises OLT installed at CO; a plurality of ONTs installed at subscribers; a first RN being comprised of a BSWDM which splits D-band into D1 and D2 sub-bands and combines U1 and U2 sub-bands into U-band, and two second RNs embodied by two AWGs. BSWDM may be embodied simply by using a device having a periodic transmission wavelength characteristic, similarly to AWG. D-band signals being transmitted from OLT to each ONT are split into D1 sub-band signals and D2 sub-band signals in BSWDM of a first RN, and D1 sub-band signals and D2 sub-band signals are respectively transmitted to two second RNs different from each other through separate optical fibers. Each FSR for AWG1 and AWG2 being used in two second RNs is the same as a wavelength range of the split sub-bands (i.e., D1 sub-band and D2 sub-band), and two AWGs having the same characteristic is used as AWG1 and AWG2, respectively. U1 sub-band signals and U2 sub-band signals being transmitted from each ONT to OLT are respectively multiplexed in AWG1 and AWG2, are combined in BSWDM of the first RN after passing through the separate optical fibers, and then are de-multiplexed in AWG located at OLT.

In an embodiment shown in FIG. 3, because equipments for subscribers employ only a filter for splitting D-band and U-band, each of which is a basic band, independently of the split sub-bands, it is possible for all ONTs to employ the same type of an optical transceiver.

Any light source may be employed if it can be used for a WDM-PON. As a typical light source, a distributed-feedback laser diode (DFB LD), a wavelength-locked Fabry-Perot laser diode (F-P LD) by an incoherent light source injected from outside suggested in Korean Patent No. 32687 entitled "Low-cost WDM source with an incoherent light injected Fabry-Perot laser diode" filed on Dec. 12, 1999 and registered on Feb. 8, 2002 by the applicant of the present invention, a spectrum-sliced light emission diode (LED), or a semiconductor optical amplifier into which an incoherent light source is injected from outside, can be employed. In addition, a tunable laser may be employed as a light source. In case that a wavelength-locked F-P LD, a spectrum-sliced light emission diode (LED), or a semiconductor optical amplifier into which an incoherent light source is injected from outside is employed as a light source, services can be provided by using the same type of an F-P LD, an LED, or a semiconductor optical amplifier at all ONTs.

Figure 4:
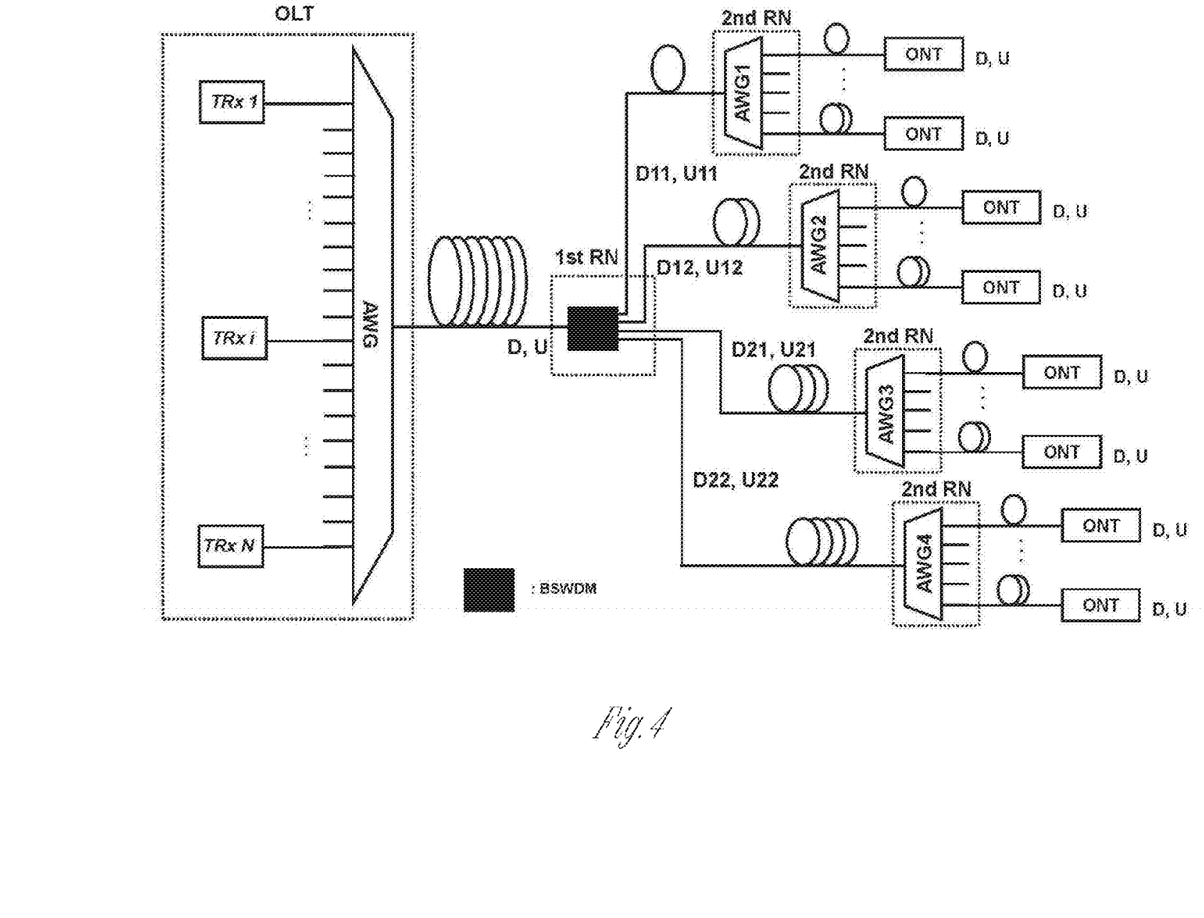
FIG. 4 illustrates a structural view of four-starred WDM-PON which uses a wavelength assignment method and a BSWDM in accordance with the present invention.

FIG. 4 illustrates a structural view of four-starred WDM-PON which uses a wavelength assignment method and a BSWDM in accordance with the present invention. D sub-band signals being transmitted from OLT to each ONT are split into D11, D12, D21 and D22 sub-band signals, respectively, in BSWDM of a first RN, and D11, D12, D21 and D22 sub-band signals are respectively transmitted to four second RNs different from each other through separate optical fibers. U11, U12, U21 and U22 sub-band signals being transmitted from each ONT to OLT are respectively multiplexed in AWG1, AWG2, AWG3 and AWG 4, are combined in BSWDM of the first RN after passing through the separate optical fibers, and then are de-multiplexed in AWG located at OLT. Although the BSWDM of the first RN is possible to be embodied by connecting several filters each other, it may be embodied simply by using equipment having a periodic transmission wavelength characteristic, similarly to AWG.

Figure 5:
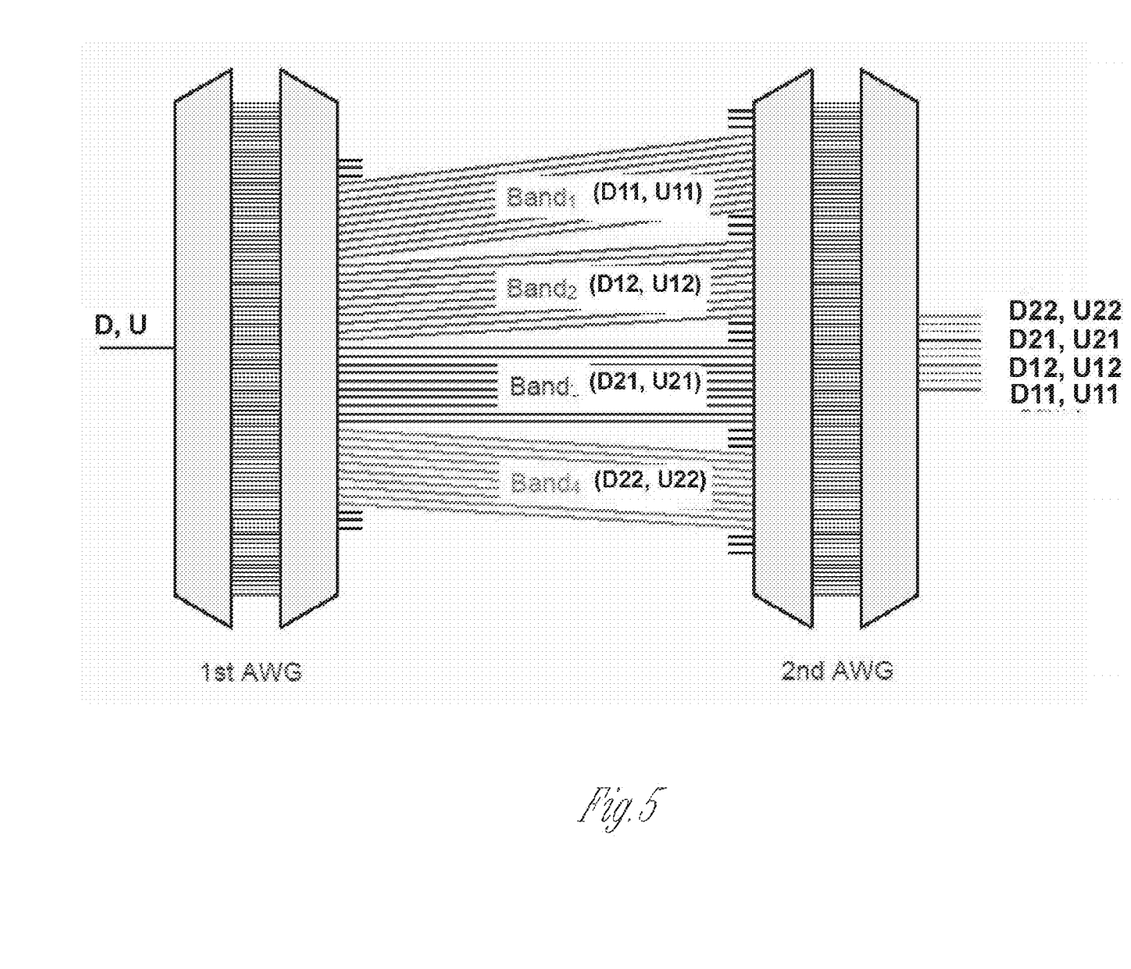
FIG. 5 illustrates a structural view of a BSWDM being used in FIG. 4 and its transmission characteristic.

FIG. 5 illustrates a structural view of a BSWDM being used in FIG. 4 and its transmission wavelength characteristic. Referring to FIG. 5, a BSWDM has one input port and four output ports for down-stream signals. Input signals corresponding to D-band are inputted to one input port, while each of four output ports outputs output signals corresponding to D11, D12, D21 and D22 sub-bands. Further, the BSWDM has four input ports and one output port for up-stream signals. Input signals corresponding to U11, U12, U21 and U22 sub-bands are inputted to each of four input ports, while one output port outputs output signals corresponding to U-band.

Referring back to FIG. 4, each of the second RNs may accommodate subscribers distributed in areas different firm each other. Each FSR for AWG1, AWG2, AWG3 and AWG4 being used in four second RNs is the same as a wavelength range of the split sub-bands, as given by the below formula (4), and thus four AWGs having the same characteristic are used as AWG1, AWG2, AWG3 and AWG4, respectively.

$$FSR = \lambda_{gi} + (n-1)\lambda_c \qquad (4)$$

In an embodiment shown in FIG. 4, because equipments for subscribers employ only a filter for splitting D-band and U-band, each of which is a basic band, independently of split sub-bands, it is possible for all ONTs to employ the same type of an optical transceiver.

Figure 6:
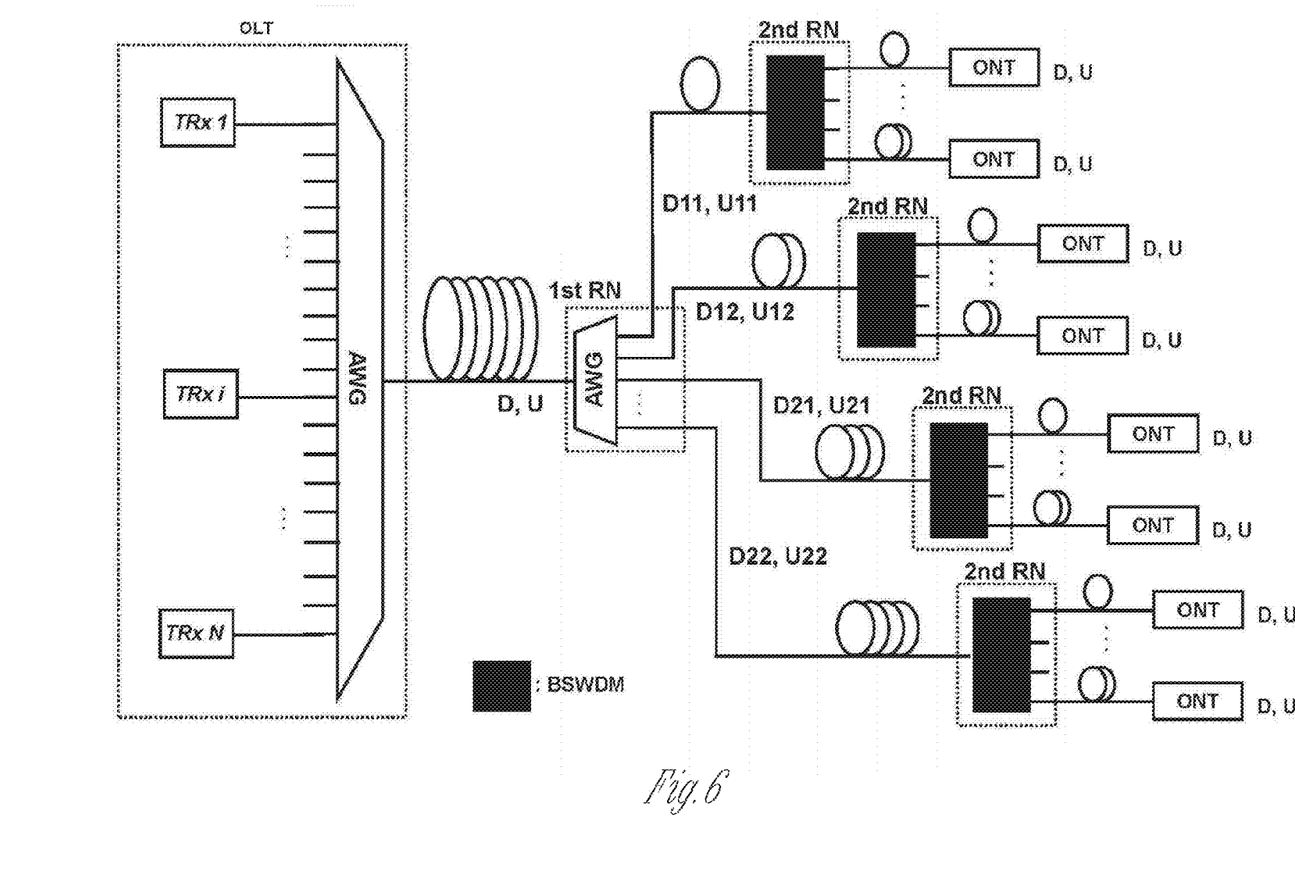
FIG. 6 illustrates a structural view of a multiple starred WDM-PON where a position of a BSWDM used in FIG. 4 is changed.

Further, because all of the BSWDM, AWG1, AWG2, AWG3 and AWG4 being employed in FIG. 4 are a passive device, it is possible to change the positions thereof. That is, it is possible that AWG being used in a position within a second RN may be used in a position within the first RN where BSWDM is placed, while BSWDM may be used in each position of AWG1, AWG2, AWG3 and AWG4 being used within four second RNs. In a case that a WDM-PON shown in FIG. 4 has 64 channels, the BSWDM of the first RN is 1×4 (here, 1 indicates a number of ports at one side of the BSWDM, and 4 indicates a number of ports at the other side of the BSWDM), while AWG1, AWG2, AWG3 and AWG4 of four second RNs are 1×16, respectively. If the positions of the two filters are changed each other, 1×16 AWG is used in the first RN, while 1×4 BSWDM is used in each of four second RNs, as can be seen from FIG. 6.

Figure 7:
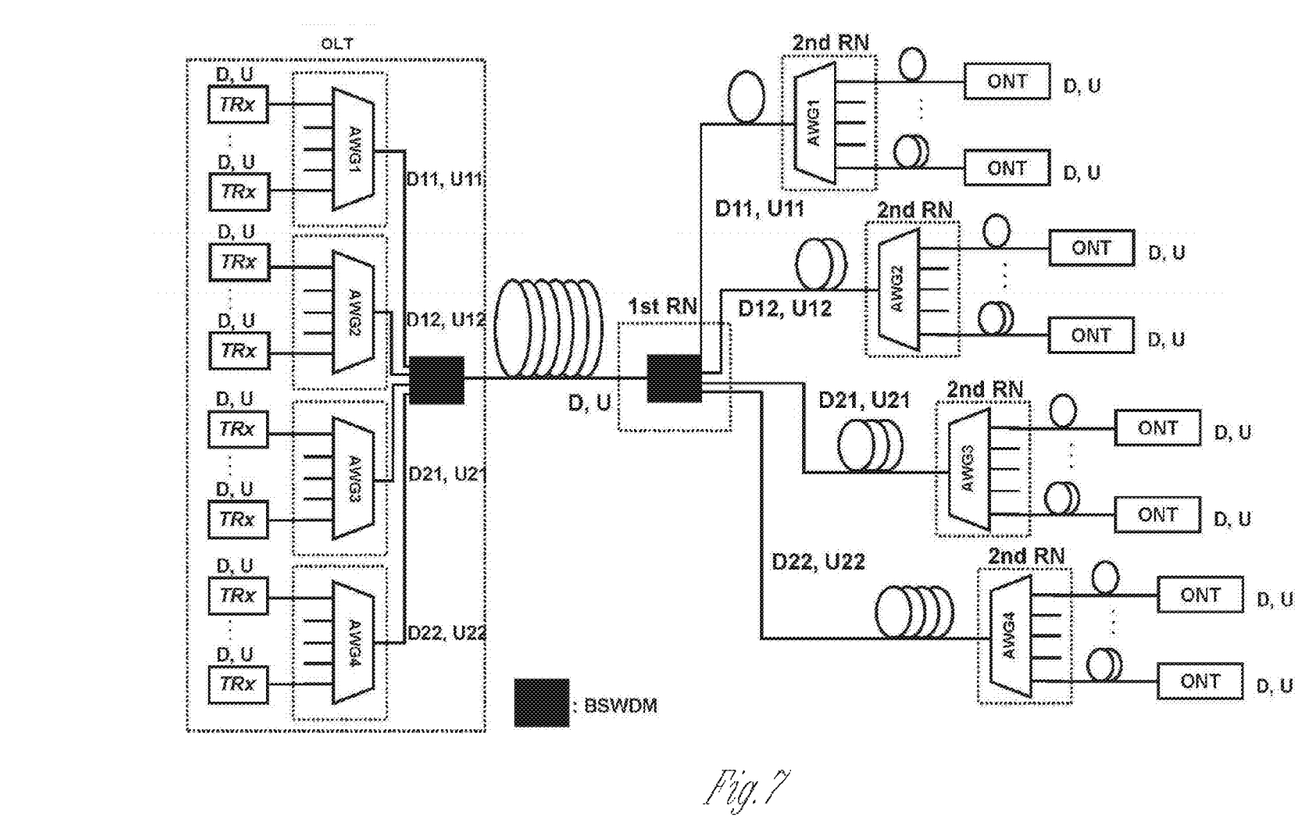
FIG. 7 illustrates a structural view of a multiple starred WDM-PON having a structure capable of additional installation subsequently by splitting OLT installed at CO into plural OLTs, according to a request from subscribers.

FIG. 7 illustrates a structural view of a multiple starred WDM-PON having a Structure capable of additional installation subsequently by splitting OLT installed at CO into plural OLTs, according to a request from subscribers. That is, FIG. 7 illustrates a structure of a WDM-PON where additional installation may be possible subsequently by changing a structure of OLT shown in FIG. 4. Referring to FIG. 7, it is possible by embodying a WDM-PON being operated initially in D11 and U11 sub-bands, while the WDM-PON needs to be additionally installed when the number of subscribers is increased, where the WDM-PON is operated in D12 and U12 sub-bands, in D21 and U21 sub-bands, and finally in D22 and U22 sub-bands, respectively. Here, the order of sub-bands for installing a WDM-PON additionally does not matter. Similarly, an application of embodying a WDM-PON where the structure of OLT can be installed additionally through multiple stages as illustrated in FIG. 7 is available in a case that a position of BSWDM and a position of AWG are changed each other from FIG. 6.

INDUSTRIAL APPLICABILITY

A WDM-PON having a multiple star function by using a BSWDM in accordance with the present invention accomplishes the following advantages:

First, it is possible to use a WDM-PON effectively and expand service areas by making several bands, which are multiple starred by a BSWDM, available to subscribers distributed in different areas from each other.

Second, it is easy to maintain and manage a WDM-PON system because all equipments for subscribers may employ the same type of an optical transceiver having a filter for splitting basic bands (D-band and U-band, and other bands being used), while the WDM-PON system makes it possible for subscribers distributed in different areas to use sub-bands split by multiple starring.

Third, it is easy to maintain and manage a WDM-PON system because the same type of AWGs can be employed in all RNs which are multiple starred, by using a plurality of AWGs where each FSR for the plurality of AWGs being used in a plurality of RNs is the same as a wavelength range of the split sub-bands, as given by the formula of $FSR=\lambda_{gi}+(n-1)\lambda_c$.

Fourth, it is possible to reduce initial investment costs by installing additionally OLTs and RNs subsequently depending on the increase in the number of subscribers, in case that a WDM-PON system is not installed for each subscriber.

As various modifications could be made in the constructions and method herein described and illustrated without departing from the scope of the present invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

The invention claimed is:

1. A multiple star wavelength division multiplexing passive optical network system using a wavelength assignment method, the system comprising:

an optical line termination (OLT) comprised of a first wavelength division multiplexer/de-multiplexer (WDM) and a plurality of first optical transceivers being connected to the first WDM;

a first remote node (RN) comprising a band splitting wavelength division multiplexer/de-multiplexer (BSWDM) being connected to the OLT by an optical fiber, wherein the BSWDM splits a wavelength band for certain down-stream signals into a plurality of first wavelength sub-bands and combines a plurality of second wavelength sub-bands, into which a wavelength band for certain up-stream signals is split, with the wavelength band for the certain up-stream signals;

a plurality of second RNs being connected to the first RN by a plurality of optical fibers, wherein each of the second RNs is comprised of a second WDM; and a plurality of optical network terminations (ONTs) being connected to the plurality of the second RNs by a plurality of separate optical fibers, wherein each of the plurality of ONTs comprises a second optical transceiver, wherein a guard band ($\lambda_{gb}$) positioned between an up-stream basic band being used for the wavelength band for the certain up-stream signals and a down-stream basic band being used for the wavelength band for the certain down-stream signals is given by a formula of $\lambda_{gb}=\lambda_{gi}+m[\lambda_{gi}+(n-1)\times\lambda_c]$, wherein n indicates a number of channels which exist within either the first wavelength sub-bands or the second wavelength sub-bands;

wherein $\lambda_{gi}$ indicates a guard band positioned either between the first wavelength sub-bands split from the down-stream basic band or between the second wavelength sub-bands split from the up-stream basic band;

wherein $\lambda_c$ indicates a wavelength interval between the channels;

wherein m is a natural number including number 0;

wherein the BSWDM at the first RN comprises an arrayed wavelength grating (AWG) having a periodic transmission wavelength characteristic, and each WDM at the second RNs comprises an arrayed wavelength grating (AWG) having a periodic transmission wavelength characteristic;

a free spectrum range (FSR) of the AWG at the second RNs is given by a formula of $FSR=\lambda_{gi}+(n-1)\lambda_c$ and is the same as a wavelength range of the wavelength sub-bands which are split by the BSWDM, and each of the plurality of AWGs at the second RNs have the same FSR characteristic as one another;

the second optical transceiver positioned at each ONT is the same type of an optical transceiver which splits only either the wavelength band for the certain up-stream signals or the wavelength band for the certain down-stream signals; and the ONTs employ only a filter for splitting D-band in the wavelength band for the certain down-stream signals as the down-stream basic band and U-band in the wavelength band for the certain up-stream signals as the up-stream basic band, each of which is a basic band, independently of the split sub-bands.

2. The multiple star wavelength division multiplexing passive optical network system of claim 1, wherein a distributed-feedback laser diode (DFB LD) is used as a light source for the certain up-stream signals and a light source for the certain down-stream signals.

3. The multiple star wavelength division multiplexing passive optical network system of claim 1, wherein a wavelength-locked Fabry-Perot laser diode (F-P LD) by an incoherent light source injected from outside is used as a light source for the certain up-stream signals and a light source for the certain down-stream signals.

4. The multiple star wavelength division multiplexing passive optical network system of claim 1, wherein a spectrum-sliced light emission diode (LED) is used as a light source for the certain up-stream signals and a light source for the certain down-stream signals.

5. The multiple star wavelength division multiplexing passive optical network system of claim 1, wherein a semiconductor optical amplifier into which an incoherent light source is injected from outside is used as a light source for the certain up-stream signals and a light source for the certain down-stream signals.

6. The multiple star wavelength division multiplexing passive optical network system of claim 1, wherein one or more band different from the wavelength band for the certain up-stream signals and the wavelength band for the certain down-stream signals is used as either one or both of the wavelength band for the certain up-stream signals and the wavelength band for the certain down-stream signals.

7. The multiple star wavelength division multiplexing passive optical network system of claim 1, wherein one or more band different from the wavelength band for the certain up-stream signals and the wavelength band for the certain down-stream signals is used as a band for monitoring the multiple star wavelength division multiplexing passive optical network system.

8. A multiple star wavelength division multiplexing passive optical network system using a wavelength assignment method, the system comprising:

an optical line termination (OLT) comprised of a first wavelength division multiplexer/de-multiplexer (WDM) and a plurality of first optical transceivers being connected to the first WDM;

a first remote node (RN) comprising a wavelength division multiplexer/de-multiplexer (WDM) being connected to the OLT by an optical fiber, wherein the WDM splits a wavelength band for certain down-stream signals into a plurality of wavelength sub-bands and combines a plurality of wavelength sub-bands, into which a wavelength band for certain up-stream signals is split, with the wavelength band for the certain up-stream signals;

a plurality of second RNs being connected to the first RN by a plurality of optical fibers, wherein each of the second RNs is comprised of a BSWDM; and a plurality of optical network terminations (ONTs) being connected to the plurality of the second RNs by a plurality of separate optical fibers, wherein each of the plurality of ONTs comprises a second optical transceiver, wherein a guard band ($\lambda_{gb}$) positioned between an up-stream basic band being used for the wavelength band for the certain up-stream signals and a down-stream basic band being used for the wavelength band for the certain down-stream signals is given by a formula of $\lambda_{gb} = \lambda_{gi} + m[\lambda_{gi} + (n-1) \times \lambda_c]$, wherein n indicates a number of channels which exist within either the first wavelength sub-bands or the second wavelength sub-bands;

wherein $\lambda_{gi}$ indicates a guard band positioned either between the first wavelength sub-bands split from the down-stream basic band or between the second wavelength sub-bands split from the up-stream basic band;

wherein $\lambda_c$ indicates a wavelength interval between the channels; and wherein m is a natural number including number 0;

wherein the WDM at the first RN comprises an arrayed wavelength grating (AWG) having a periodic transmission wavelength characteristic, and each BDWDM at the second RNs comprises an arrayed wavelength grating (AWG) having a periodic transmission wavelength characteristic;

a free spectrum range (FSR) of the AWG at the second RNs is given by a formula of $FSR = \lambda_{gi} + (n-1)\lambda_c$ and is the same as a wavelength range of the wavelength sub-bands which are split by the BSWDM, wherein each of the plurality of AWGs at the second RNs have the same FSR characteristic as one another;

the second optical transceiver positioned at each ONT is the same type of an optical transceiver which splits only either the wavelength band for the certain up-stream signals or the wavelength band for the certain down-stream signals; and the ONTs employ only a filter for splitting D-band in the wavelength band for the certain down-stream signals as the down-stream basic band and U-band in the wavelength band for the certain up-stream signals as the up-stream basic band, each of which is a basic band, independently of the split sub-bands.

* * * * *